Feb. 25, 1958  W. G. TOLAND, JR  2,824,893
PREPARATION OF AROMATIC CARBOXYLIC ACIDS
Filed Jan. 9, 1956
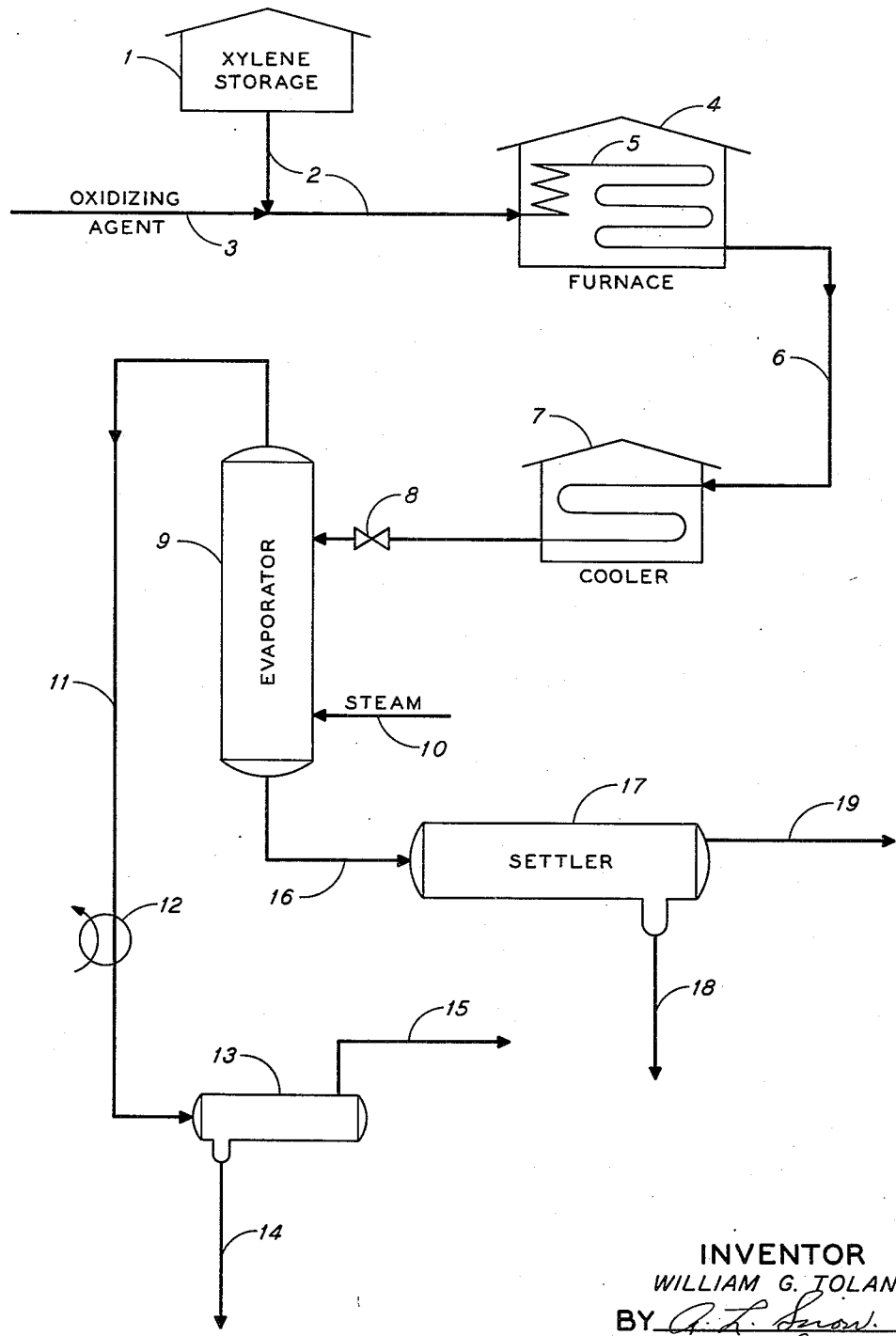
INVENTOR
WILLIAM G. TOLAND Jr.
BY
ATTORNEYS United States Patent Office 2,824,893
Patented Feb. 25, 1958

2,824,893

PREPARATION OF AROMATIC CARBOXYLIC ACIDS

William G. Toland, Jr., San Rafael, Calif., assignor to California Research Corporation, San Francisco, Calif., a corporation of Delaware Application January 9, 1956, Serial No. 558,086

3 Claims. (Cl. 260—524)

This invention relates to an improved process for oxidizing organic compounds to produce organic acidic products. More particularly, the invention relates to an improvement in an oxidation process in which a lower alkyl benzene, an oxidizing agent in which sulfur atoms at valence levels from 0 to +6 are the effective oxidizing agent, and a large molar excess of water are heated to a temperature above about 550° F. under a superatmospheric pressure sufficient to maintain a part of the water in liquid phase for a time sufficient to effect conversion of a substantial part of the alkyl benzenes to benzene carboxylic acids or benzene carboxylic acid derivatives.

In U. S. Patent No. 2,495,567, a process is described in which acyclic olefins are oxidized to carboxylic acid amides by heating them with sulfur, water and ammonia to a temperature above about 100° C.

More recently, it has been found that alkyl aromatic hydrocarbons such as the xylenes may be oxidized to aromatic carboxylic acids by heating them with sulfur, water and a base to a temperature above about 500° F. under a superatmospheric pressure sufficient to maintain a part of the water in liquid phase and that toluic acids may be similarly oxidized to phthalic acids.

My copending application, Serial No. 202,389, filed December 22, 1950, now Patent No. 2,722,546, discloses a process for oxidizing xylenes to phthalic acids with water, ammonium sulfate and a water-soluble sulfide.

In the recovery and purification of phthalic acids produced by oxidizing xylenes, with a water-soluble sulfate, a water-soluble sulfide and water, great difficulty is encountered in producing an acidic product free of elemental sulfur. The nature of the difficulty may be illustrated by a description of the routine which it has been necessary to follow in separating a purified acidic product from the reaction mixture produced when para-xylene is oxidized by heating it with ammonium sulfate, ammonium polysulfide and water. After the reaction mixture has been held at a temperature of about 600° F. for a period usually in the range from 1 to 3 hours, sufficient to convert substantially all of the xylene to phthalic acid, ammonium phthalate and phthalic acid amides, the reactor is depressured and cooled and a reaction product is worked up by first refluxing it at atmospheric pressure to remove ammonia and hydrogen sulfide from the reaction mixture. Following the refluxing, the reaction product mixture is filtered to separate elemental sulfur which may be present. Sodium hydroxide is then added to the filtrate and the mixture is steam stripped to convert the phthalic acid amides present to phthalic acid salts by removing the ammonia. After heating, the mixture is acidified to pH 6 to precipitate any additional elemental sulfur and filtered to remove this sulfur. This second filtrate is then acidified to a pH of 3 to 4 to precipitate terephthalic acid. No matter how carefully the steps prior to the final acidification are conducted, it is found that on the final acidification elemental sulfur is precipitated together with the acid. In order to get rid of this sulfur impurity, it has been necessary to dissolve the terephthalic acid in aqueous sodium hydroxide, filter the solution to remove sulfur, and re-acidify to precipitate sulphur-free terephthalic acid.

It is an object of this invention to provide a simple method for recovering the acid product of the oxidation process free from elemental sulfur.

It appears that the sulfur precipitated together with the acid product in the final acidification step is due in part to decomposition of water-soluble complex sulfur compounds including thiosulfate ions, thionate ions and polysulfide ions produced during the course of the oxidation reaction and in part to incomplete separation of colloidal solid sulfur particles during filtration.

It has now been found that the difficulty in eliminating elemental sulfur impurities from the reaction product mixture and from the final acid product can be very substantially reduced by evaporating ammonia, hydrogen sulfide and part of the water from the reaction product mixture, while maintaining it at a temperature from 240° F. to approximately reaction temperature. During the evaporation step, the materials escaping from the reaction product mixture are predominantly hydrogen sulfide, hydrogen disulfide, ammonia and water vapor. During the evaporation it appears that thiosulfate ions, thionate ions, and polysulfide ions contained in the reaction product mixture decompose and disproportionate to form primarily hydrogen sulfide, sulfur, and sulfate ions. Not only are the thiosulfate ions, thionate ions, and polysulfide ions decomposed and thus eliminated during the evaporation step, but also it appears that part of the elemental sulfur contained in the reaction product mixture is removed from the reaction product mixture during the depressuring operation, presumably in the form of hydrogen disulfide and in the form of hydrogen sulfide produced by reaction of sulfur with water to form hydrogen sulfide and sulfate ions. The remainder of the sulfur contained in the product is in liquid phase and the liquid particles coalesce, forming a continuous liquid sulfur phase which is readily separated from the aqueous phase.

The following examples show the contrasting results obtained when xylenes are oxidized by hydrogen sulfide, ammonium sulfate and water and the process is conducted with and without the step of evaporating the reaction mixture at temperatures from 240° F. to reaction temperature.

EXAMPLE 1

125 g. of meta-xylene, 167 g. of hydrogen sulfide, 255 g. of ammonium sulfate and 1500 g. of water were charged to a 4.5 liter stainless steel bomb. The bomb was sealed and heated to 600° F. The contents of the bomb were held at this temperature for 60 minutes during which the pressure attained a maximum value of 2350 pounds per square inch. The bomb was cooled to atmospheric temperature, depressured, and opened. The reaction product mixture removed from the bomb had a pH of 8. This mixture was steam-stripped to pH 6 and then cooled and filtered. The filter cake contained 8.6 g. of elemental sulfur. The yellow filtrate was treated with 2 g. of adsorbent charcoal at 180° F. for 5 minutes and filtered again. The second filtrate was also distinctly yellow in color. The latter filtrate was acidified with hydrochloric acid to a pH 2 to precipitate phthalic acids. The odor of sulfur dioxide was noted during the acidification with hydrochloric acid and the solid acid was contaminated with elemental sulfur. All of the meta-xylene was oxidized during the reaction and the acid product had a saponification equivalent of 84.8.

EXAMPLE 2

90 g. of meta-xylene, 178 g. of ammonium sulfate, 147 g. of hydrogen sulfide, and 1125 g. of water were charged to a 2.5 liter stainless steel bomb. The bomb was sealed and heated to a temperature of 600° F. The contents of the bomb were maintained at this temperature for a period of 60 minutes. During this period the pressure in the bomb attained a maximum value of 2900 pounds per square inch. At the end of the 60-minute period, vapors were bled from the bomb while its temperature was maintained at 600° F. until the pressure was reduced to about 1700 pounds per square inch. The bomb was then cooled to atmospheric temperature and opened. The reaction product mixture had a pH of 5. The reaction product mixture was steam-stripped, cooled and filtered. The filter cake weighed 1 gram and consisted of elemental sulfur and small amounts of carbonaceous material. The filtrate was then treated with 2 grams of adsorbent charcoal at 180° F. for 5 minutes and filtered again. The second filtrate was water-white. This second filtrate was acidified with hydrochloric acid to pH 2. No sulfur dioxide odor was noted during the acidification. The filter cake was a white solid, free of elemental sulfur, and had a saponification equivalent of 82.7. All of the meta-xylene was oxidized during the reaction.

EXAMPLE 3

90 g. of meta-xylene, 178 g. of ammonium sulfate, 142 g. of hydrogen sulfide and 1125 cc. of water were charged to a 2½ liter bomb. The bomb was sealed and heated to 600° F. for a period of 15 minutes, during which the pressure attained a maximum of 2650 p. s. i. g. The heating was discontinued and hydrogen sulfide, ammonia and water vapor were bled from the bomb at 600° F. until the pressure was reduced to about 1500 p. s. i. g. The bomb was then cooled to room temperature and opened. The reaction product was filtered to remove elemental sulfur and the filtrate acidified to precipitate isophthalic acid and isophthalic acid amides. The solid product had a neutral equivalent of 96.3, a saponification equivalent of 82.8, and contained only slight traces of elemental sulfur.

EXAMPLE 4

90 g. of meta-xylene, 178 g. of ammonium sulfate, 147 g. of hydrogen sulfide and 1125 cc. of water were charged to a 2.5 liter bomb. The bomb was sealed and heated to 600° F. for one hour with constant shaking. The pressure attained a maximum value of 2900 p. s. i. g. Hydrogen sulfide, ammonia and water vapor were bled from the bomb at approximately reaction temperature while the shaking was continued. The bomb was cooled and opened. The product was a liquid having a pH value of 5. It was filtered to remove 1.0 g. of sulfur and cake. The liquid product was acidified to pH 2, causing precipitation of 103.8 g. of a solid product having a saponification equivalent of 82.7 and a neutral equivalent of 90.3. This product was substantially completely free of elemental sulfur. The gases bled from the bomb at reaction temperature were passed through a caustic scrubber. The scrubber and contents showed an increase in weight of 140 g. during the scrubbing operation. The scrubbing liquid was filtered and a filter cake having a weight of approximately one gram and consisting essentially of elemental sulfur was recovered.

EXAMPLE 5

805 cc. of an oxidizing agent made up by mixing 430 g. of aqueous ammonium bisulfite having a bisulfite content of 45% by weight with water containing 8.8% by weight hydrogen sulfide present as ammonium sulfide and 75 g. of a mixture of meta-xylene and para-xylene containing 85% by volume of meta-xylene were charged to a bomb. The bomb was sealed and heated to 600° F. for 1½ hours with constant shaking. Heating was discontinued and gases were bled from the bomb for a period of 15 minutes until the pressure was reduced to 900 p. s. i. g. and the temperature to 540° F. The material bled from the bomb was condensed and the volume of the condensate was 350 cc. The condensate was a dark yellow solution. The solution was steam stripped to pH 6. Finely divided sulfur precipitated from the condensate during the steam stripping.

The bomb was cooled to room temperature and opened. The reaction product was a homogeneous yellow solution having a pH value of 8. The odors of hydrogen sulfide and ammonia were both exhibited by the solution. The solution was steam stripped to a pH value of 7, cooled, filtered, mixed with 1 g. of activated charcoal and filtered again. The filtrate had a light yellow color. The filtrate was again stripped with steam until a pH value in the range from 5 to 6 was reached. Again, 1 g. of activated charcoal was mixed with the liquid and the mixture was filtered, yielding a colorless filtrate having a volume of 1405 cc. Half of the filtrate was heated to 200° F. Sulfuric acid was added to the filtrate until a pH value of 1 was reached. No sulfur dioxide was evolved during acidification and no free sulfur was contained in the product. The product was a white powder having a weight of 40.8 g., a neutral equivalent of 100, and a saponification equivalent of 83.7.

EXAMPLE 6

56 parts by weight of a mixture of meta- and para-xylene having a meta-xylene content of 85% by volume, 123 parts by weight of ammonium sulfate, 8.8 parts by weight of ammonium sulfide, 6 parts by weight of elemental sulfur and 314 parts by weight of water were passed through a tubular oxidation zone at a temperature of 630° F. and a pressure of 3000 p. s. i. g. The residence time of the mixture in the reaction zone was approximately 35 minutes. The product effluent from the reaction zone contained .2 part by weight of ammonium sulfate, 6.6 parts by weight of elemental sulfur, 342 parts by weight of water, 83 parts by weight of phthalic acid amides, half amides and ammonium salts, 13 parts by weight of carbon dioxide, 20 parts by weight of ammonia and 35 parts by weight of hydrogen sulfide. The effluent from the reactor was cooled to 350° F. and passed into an evaporation zone. The evaporation zone was a stripping column operated at a bottoms temperature of 275° F. and a pressure of 25 p. s. i. g. Hydrogen sulfide, ammonia, water, carbon dioxide and some elemental sulfur were removed overhead. Low pressure steam was passed into the bottom of the evaporation zone to facilitate removal of the overhead products. A stripped liquid product was removed from the bottom of the evaporation zone. This product contained .2 part by weight of ammonium sulfate, 6 parts by weight of elemental sulfur, 325 parts by weight of water and 83 parts by weight of phthalic acid derivatives. The liquid product was settled at 260° F. under a pressure of 20 p. s. i. g. A liquid sulfur phase was removed from the bottom of the settler. An upper aqueous phase was removed from the settler. The aqueous phase contained .2 part by weight of ammonium sulfate, 325 parts by weight of water, and 83 parts by weight of phthalic acid derivatives. The aqueous phase was substantially completely free of elemental sulfur.

From the foregoing examples it is clear that depressuring the reaction product mixture by bleeding gases from the mixture at temperatures from 240° F. to approximately reaction temperature has a very marked effect in reducing the total sulfur content of the reaction product mixture. The process of the invention is especially attractive where the acid produced by the oxidation is normally a solid material. In cases of this kind, acidification of the reaction product mixture precipitates the solid acid and, together with it, solid elemental sulfur, unless means are taken to remove the sulfur from the reaction product mixture prior to acidification. The only method then open to the producer for removing the sulfur contaminant from the acid product is that of redissolving the acid product in an aqueous base and filtering to remove undissolved elemental sulfur.

The manner in which the process of the invention may be applied to a continuous process for producing organic acids by heating an organic compound with sulfur and ammonia may be described by reference to the appended drawing, which illustrates suitable apparatus and process flow for the practice of the invention.

Xylenes are passed from storage tank 1 through line 2 into heating coil 5 in the interior of furnace 4. The oxidizing solution of ammonium sulfate, water and ammonium polysulfide is passed through line 3 into line 2 and then into heating coil 5. The proportions of xylene and the oxidizing solution are approximately those shown in Example 5. The residence time of the reaction mixture in coil 5 is ordinarily 25 minutes to about 1 hour and the temperature of the reaction mixture in coil 5 is usually in the range from 600° F. to 650° F. A superatmospheric pressure of the order of 3000 pounds gauge is maintained in coil 5. The reaction product mixture is withdrawn from furnace 4 through line 6 and passed through cooler 7 in which it is cooled to a temperature in the range from 300° F. to 400° F. The cooled mixture is passed through pressure reduction valve 8 into evaporation column 9. Ammonia, hydrogen sulfide, carbon dioxide, some elemental sulfur and some water vapor are removed overhead through line 11 and passed through heat exchanger 12 to condense the normally liquid components of the overhead. The condensate is settled in gas liquid separator 13. Aqueous ammonium sulfide is removed from separator 13 through line 14 for ultimate return to the oxidation zone. Hydrogen sulfide, ammonia and carbon dioxide gases are removed from separator 13 through line 15. These gases are subsequently scrubbed with sulfuric acid to remove ammonia, forming ammonium sulfate which is returned to the oxidation zone. Low pressure steam is desirably introduced into the bottom of evaporation zone 9 through line 10 to facilitate the evaporation of the overhead fraction. The stripped liquid product is withdrawn from evaporation zone 9 through line 16 and passed into settler 17. In settler 17 a lower liquid sulfur phase is formed. The liquid sulfur is withdrawn through line 18 and subsequently dissolved in ammonium sulfite for return to the reaction zone. A substantially completely sulfur-free aqueous solution of ammonium phthalates and phthalic acid amides is withdrawn from settler 17 through line 19 for subsequent hydrolysis to form phthalic acids. Settler 17 is operated at a temperature above 240° F., and preferably at a temperature of about 260° F., under a pressure of from 20 to 30 pounds gauge. Cooler 7 may be omitted if desired and the reaction product mixture passed into evaporation zone 9 directly from the oxidation zone.

The purification of the oxidation reaction product pursuant to the invention is considerably improved in effectiveness, especially when the alkyl benzene subjected to oxidation is para-xylene, by injecting 10 to 50 mols of water per mol of alkyl benzene charged to the oxidizing zone into line 6. The injection of water in this manner and in these amounts has been found to minimize the tendency to precipitate solid organic reaction products in evaporator 9 and in settler 17. Such precipitation reduces ultimate yields of the desired product and the precipitate ordinarily contains occluded sulfur. Ordinarily, the quantity of water charged to the oxidation zone is such that the mol ratio of water to hydrocarbon is 30–40:1. For optimum efficiency in the purification process, especially when para-xylene is oxidized, water should be added to the oxidation reaction product in amount sufficient to give the reaction product a content of 50 to 90 mols of water per mol of hydrocarbon charged to the oxidation zone. Larger quantities of water can be added to the oxidation product prior to evaporation, but little incremental benefit is obtained.

While it is feasible to conduct the evaporation at any temperature above 240° F. and below about 700° F., the portion of the temperature range lying between about 375° F. and 425° F. is less desirable than the other portions of the temperature range because elemental sulfur within this temperature range is a rather viscous liquid and more difficult to handle in settler 17 than liquid sulfur either below 375° F. or above 425° F.

Evaporation prior to acidification of the liquid reaction product pursuant to the process of the invention must be carried out at a temperature above 240° F. irrespective of the temperature at which the reaction has been conducted. Usually, the oxidation reaction will be conducted at temperatures in the range from 500° F. to 700° F. so that no net heat input in the depressuring vessel is required and a considerable amount of cooling of the reaction product may actually occur in that vessel provided that its steady state temperature is not below 240° F.

Where the reaction is conducted batch-wise, for example, in a bomb or pressure autoclave, gradual depressuring is necessary in order to avoid loss of the liquid reaction product by foaming. The bleeding of the reaction product gases ordinarily extends over a period from about 15 minutes to about 1 hour in a batch operation. In a continuous oxidation process, a large depressuring vessel eliminates the hazard of liquid loss through foaming and in such a system it is residence time at the reduced pressure and not the time during which the bleeding or depressuring occurs that is important. The liquid reaction product should be permitted a residence of from 10 minutes to 1 hour in the evaporation vessel in order to provide time for complete decomposition of thiosulfate, thionate and polysulfide ions.

When the evaporation is conducted at about 500° F., the pressure is ordinarily reduced by from 500 to 1500 pounds per square inch. The pressure is not reduced below the partial pressure of water in the reaction mixture at the depressuring temperature, since it is desirable to maintain a substantial amount of liquid water in the reaction product. If the pressure is permitted to fall below the partial pressure of water at the depressuring temperature for an appreciable period of time, substantial amounts of water will be lost from the reaction product mixture and deposition of a solid product may result. The formation of such a solid reaction product, either in the evaporation vessel auxiliary to a tubular reactor or in an autoclave or bomb where batch operation is conducted, is undesirable since the problem of handling the product becomes serious. Such solid reaction products may have to be mechanically dislodged from the walls of the reactor or evaporation vessel, or re-dissolved in hot water in order to conveniently handle them. The evaporation in general is so controlled that the mol ratio of water to phthalic acid values in the evaporated product is in excess of about 20 to 1 to minimize solid deposition.

The sulfur contamination difficulty stemming from the presence of colloidal sulfur and of thiosulfate ion, thionate ion, and polysulfide ion in the reaction product mixture is also encountered in variations of the oxidation process in which sulfurous materials containing sulfur at a valence above minus 2 and below plus 6, mixtures of water-soluble sulfates with water-soluble sulfur compounds containing sulfur at a valence below plus 6, or mixtures of water-soluble sulfates and elemental sulfur, are employed as the oxidizing agent. The difficulty is also encountered where the base introduced into the reaction zone is any of the following: ammonia, ammonium salts, nitrogen compounds convertible to ammonia under the conditions of the reaction, alkali metal hydroxides, alkaline earth metal hydroxides and salts of alkali and alkaline earth metal hydroxides with weak acids, especially weak inorganic acids. The variety of sulfurous materials and basic materials which may be employed together with water to constitute the oxidizing agent of the process and the employment of which is accompanied by the formation of thiosulfate ions in the reaction mixture, thus introducing a sulfur removal problem, is indicated in the following Table I where a number of operative combinations of oxidizing materials is listed.

*Table I*

OXIDIZING AGENTS

1. Hydrogen sulfide_____(NH$_4$)$_2$SO$_4$, water
2. Hydrogen sulfide_____Na$_2$SO$_4$, water
3. Hydrogen sulfide_____K$_2$SO$_4$, water
4. Hydrogen sulfide_____(NH$_4$)$_2$SO$_3$, water
5. (NH$_4$)$_2$S_____(NH$_4$)$_2$SO$_4$, water
6. (NH$_4$)$_2$SO$_3$_____water
7. (NH$_4$)$_2$SO$_3$_____(NH$_4$)$_2$SO$_4$, water
8. Na$_2$S$_2$O$_3$_____NH$_3$, water
9. (NH$_4$)$_2$S$_x$_____(NH$_4$)$_2$SO$_4$, water
10. (NH$_4$)$_2$S_____Na$_2$SO$_4$, water
11. Elemental sulfur_____NaOH, water
12. Elemental sulfur_____Na$_2$CO$_3$, water
13. Elemental sulfur_____CaCO$_3$, water The sulfur removal difficulty believed to be attributable to the presence of colloidal sulfur and of thiosulfate ions, thionate ions and polysulfide ions in the reaction mixture is experienced not only in the oxidation of olefinic, paraffinic, and alkyl aromatic hydrocarbons, but also in the oxidation of products of partial oxidation of hydrocarbons such as in the oxidation of toluic acid to phthalic acid in runs conducted at temperatures of 545° F. to 600° F. with the oxidizing agents in the above table; in the oxidation of acetophenone to benzoic acid at about 580° F. with the oxidizing agents of the above table; in the oxidation of benzyl alcohol at 600° F. to benzoic acid; and in the oxidation of cyclohexanone at 555° F. to produce phenol. The difficulty is also encountered in the oxidation of heterocyclic compounds containing an oxygen or sulfur atom in the ring such as tetrahydrofuran, furan, thiophene and thiophane and in the oxidation of alkyl sulfides such as diamyl sulfide.

This application is a continuation-in-part of my copending application Serial No. 458,472, filed September 27, 1954, and now abandoned.

I claim:

1. A process for producing phthalic acids of high purity which comprises heating a xylene with ammonium sulfate, a water-soluble sulfide and water to a temperature in the range about 550° F. to 700° F. under a superatmospheric pressure sufficient to maintain a part of the water in liquid phase, evaporating ammonia, hydrogen sulfide and a part of the water from the reaction product mixture at a temperature in the range from 240° F. to 600° F., settling the evaporated reaction product to separate an upper aqueous phase containing phthalic acid amides and ammonium salts and substantially completely free of elemental sulfur and a lower liquid sulfur phase and hydrolyzing the aqueous phase to precipitate phthalic acids.

2. A process for producing phthalic acids of high purity which comprises heating a xylene with ammonium sulfate, a water-soluble sulfide and water to a temperature in the range from 550° F. to 700° F. under a superatmospheric pressure sufficient to maintain a part of the water in liquid phase, cooling the reaction product to a temperature in the range from 240° F. to 375° F., evaporating the reaction product at a temperature in the range from 240° F. to 375° F. to remove a part of the water and substantially all of the ammonia and hydrogen sulfide from the reaction product, settling the evaporated reaction product at a temperature in the range from 240° F. to 375° F. to separate an upper aqueous phase containing phthalic acid amides and ammonium salts and substantially free of elemental sulfur and a lower liquid sulfur phase and heating the aqueous phase with a strong mineral acid to precipitate phthalic acids.

3. A process which comprises heating an alkyl benzene containing 1 to 3 carbon atoms in each of its alkyl groups with ammonium sulfate, a water-soluble sulfide and water in an oxidation zone to a temperature in the range from about 550° F. to about 700° F. under a superatmospheric pressure sufficient to maintain a part of the water in liquid phase, passing the reaction product into an evaporation zone maintained at a temperature in the range about 240° F. to 600° F. and evaporating substantially all of the ammonia and hydrogen sulfide and a part of the water from the reaction product, settling the liquid residue from the evaporation step to separate an aqueous phase and a liquid sulfur phase, separating the phases, and returning the sulfur phase to the oxidation zone together with further quantities of aqueous ammonium sulfate and alkyl benzene.

References Cited in the file of this patent

UNITED STATES PATENTS

| | | |
|---|---|---|
| 2,695,312 | Toland | Nov. 23, 1954 |
| 2,722,546 | Toland | Nov. 1, 1955 |
| 2,722,548 | Aroyan | Nov. 1, 1955 |
| 2,734,079 | Aroyan et al. | Feb. 7, 1956 |